United States Patent [19]
Crowley et al.

[11] Patent Number: 6,073,076
[45] Date of Patent: *Jun. 6, 2000

[54] MEMORY MANAGEMENT FOR NAVIGATION SYSTEM

[75] Inventors: Paul Crowley, Buffalo Grove; John Jaugilas, Lombaro; Alex Nash, Gurnee; Senthil Natesan, Carol Stream; David S. Lampert, Highland Park, all of Ill.

[73] Assignee: Navigation Technologies Corporation, Rosemont, Ill.

[*] Notice: This patent is subject to a terminal disclaimer.

[21] Appl. No.: 09/049,747

[22] Filed: Mar. 27, 1998

[51] Int. Cl.$^7$ ..................................................... G06F 17/30
[52] U.S. Cl. .......................................... 701/208; 707/102
[58] Field of Search .................... 707/1, 5, 10, 100–104, 707/200–206; 701/208

[56] References Cited

U.S. PATENT DOCUMENTS

| | | | |
|---|---|---|---|
| 4,876,651 | 10/1989 | Dawson et al. | 364/449 |
| 5,101,357 | 3/1992 | Tempelhof | 364/449 |
| 5,781,195 | 7/1998 | Marvin | 345/428 |
| 5,848,373 | 10/1999 | DeLorme | 701/200 |
| 5,867,110 | 2/1999 | Naito et al. | 340/995 |
| 5,893,901 | 4/1999 | Maki | 704/260 |
| 5,953,722 | 9/1999 | Lampert et al. | 707/100 |
| 5,966,135 | 10/1999 | Roy et al. | 345/433 |
| 5,968,109 | 10/1999 | Israni et al. | 701/208 |
| 5,978,730 | 11/1999 | Poppen et al. | 701/202 |
| 6,016,485 | 1/2000 | Amakawa et al. | 705/400 |

*Primary Examiner*—Ruay Lian Ho
*Attorney, Agent, or Firm*—Frank J. Kozak; Lawrence M. Kaplan

[57] ABSTRACT

A method and system for managing memory resources in a system used in conjunction with a navigation application program that accesses geographic data. The geographic data are comprised of a plurality of data records. The plurality of data records are organized into parcels, each of which contains a portion of the plurality of data records, such that the data records in each portion of the plurality of data records that forms each parcel are accessed together. One or more buffers each that forms a contiguous portion of the memory of the navigation system is provided as a cache to store a plurality of parcels. One or more data structures located outside the contiguous portion of memory identify the parcels of data stored in the cache and the locations in the cache at which the parcels are stored. The one or more data structures located outside the contiguous portion of memory in which the parcels are cached are used to manage the parcel cache to use it efficiently. These one or more data structures located outside the contiguous memory in which the parcels are cached are also used to defragment the parcel cache.

29 Claims, 8 Drawing Sheets

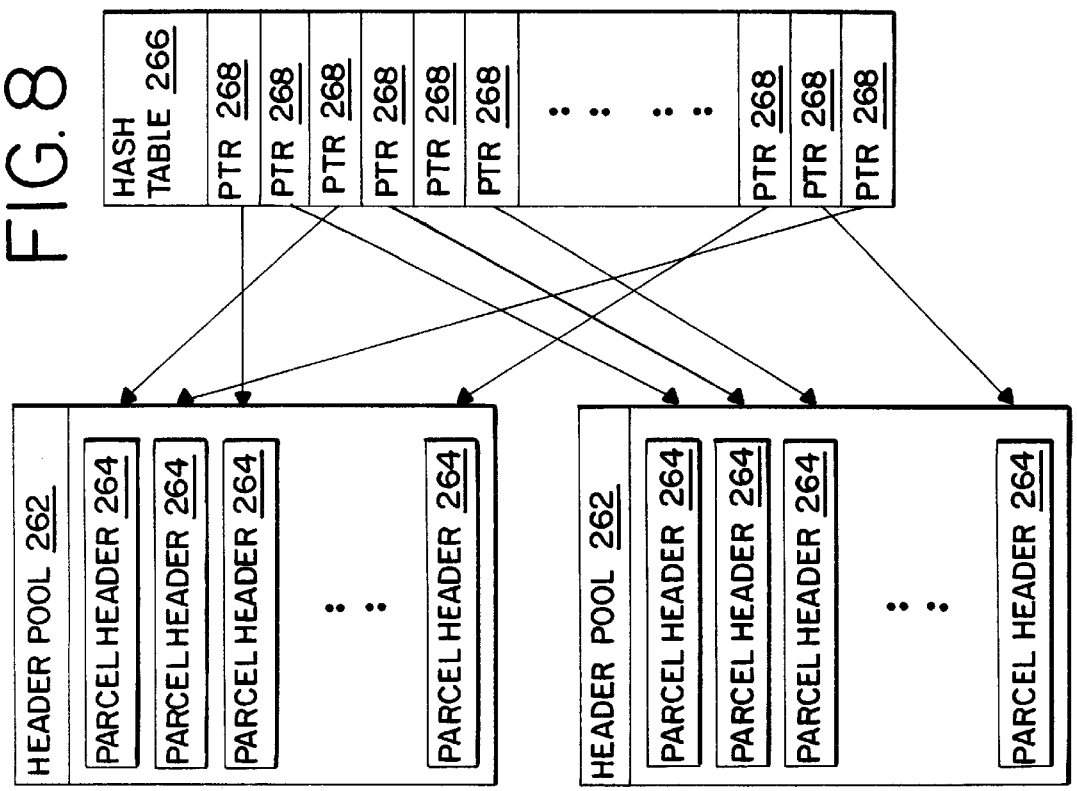
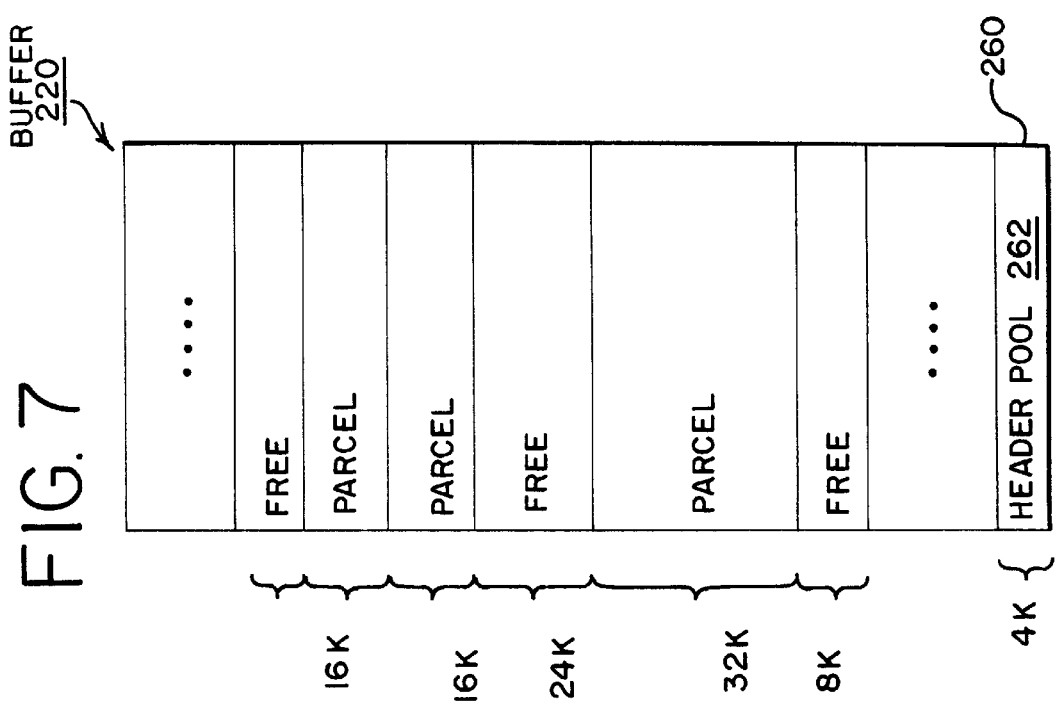

| PARCEL HEADER | |
|---|---|
| bufferID | 280 |
| pPrev | 282 |
| pNext | 284 |
| pHashPrev | 286 |
| pHashNext | 288 |
| pAddrPrev | 290 |
| pAddrNext | 292 |
| pPages | 294 |
| pCache | 296 |
| pTurnstile | 298 |
| pages | 300 |
| lockCount | 302 |
| bLoaded | 306 |
| bWired | 308 |

264

READ/CANCEL REQUESTS

PARCEL CACHE 207 — PARCEL QUEUE 400 — MDIL 408

COMPLETION NOTIFICATION

MEMORY MANAGEMENT FOR NAVIGATION SYSTEM

BACKGROUND OF THE INVENTION

The present application relates to navigation systems and in particular, the present application relates to memory management for a navigation system that facilitates use and access of a geographic database.

Computer-based navigation systems are available that provide end-users with various navigating functions and features. For example, some navigation systems are installed in vehicles and are able to provide end-users (i.e., drivers of the vehicles) with optimum routes to travel by roads between locations in a geographic region. Using input from the end-user, and optionally from equipment that can determine one's physical location (such as a GPS system), a navigation application program in the navigation system can examine various routes between two locations to determine an optimum route to travel from a starting location to a destination location in a geographic region. The navigation application program may then provide the end-user with information about the optimum route in the form of instructions that identify the maneuvers required to be taken by the end-user to travel from the starting location to the destination location. If the navigation system is located in an automobile, the instructions may take the form of audio instructions that are provided along the way as the end-user is traveling the route. Some navigation application programs are able to show detailed maps on computer displays illustrating routes to destinations, the types of maneuvers to be taken at various locations along the routes, locations of certain types of features, and so on.

In order to provide these and other navigating functions, the navigation system or application uses one or more detailed databases that include data which represent physical features in a geographic region. The detailed database may include data representing the roads and intersections in a geographic region and also may include information about the roads and intersections in a geographic region, such as turn restrictions at intersections, speed limits along the roads, street names of the various roads, address ranges along the various roads, and so on.

In order to provide a reasonably high level of functionality, a relatively large database may be provided. Storage media, such as CD-ROM discs or PCMCIA cards, are capable of handling databases of the size and complexity sufficient to provide suitable functionality. However, computer-based navigation systems are provided on various platforms including some with relatively limited computer hardware resources. For example, navigation systems that are located in vehicles or that are hand-held may have limited memory resources and relatively slow media access rates. These relatively limited hardware resources make it difficult to provide the relatively high level of functionality expected or required by end-users as well as suitably fast performance. Aside from being undesirable, slow performance in a navigation system may render the system useless for its intended purpose in certain circumstances. For example, if the navigation system is installed in a vehicle, the driver may require information from the navigation system about a desired route in a matter of seconds in order to utilize the information while driving. If the navigation system requires more than several seconds to calculate a route, the driver may have moved beyond the point at which the routing information provided by the navigation system is relevant. Therefore, there is a need to utilize the hardware resources in a navigation system efficiently in order to provide a suitable level of performance.

Some navigation applications may be provided on computer platforms that have greater memory and other hardware resources. On these kinds of platforms, similar considerations apply, but on a different scale. On computer platforms that have greater memory and other hardware resources, even greater functionality can be provided if the available resources are used efficiently.

Accordingly, it is an objective to provide a method and system that utilizes the resources of a navigation system efficiently thereby enabling the system to provide better performance.

SUMMARY OF THE INVENTION

To achieve the foregoing and other objectives and in accordance with the purposes of the present invention, a method and system are provided for managing memory resources in a system used in conjunction with a navigation application program that accesses geographic data. The geographic data are comprised of a plurality of data records. The plurality of data records are organized into parcels or groupings, each of which contains a portion of the plurality of data records, such that the data records in each portion of the plurality of data records that forms each parcel are accessed together. One or more buffers that each form a contiguous portion of the memory of the navigation system are provided as a cache to store a plurality of parcels. One or more data structures located outside the contiguous portion of memory identify the parcels of data stored in the cache and the locations in the cache at which the parcels are stored. The one or more data structures located outside the contiguous portion of memory in which the parcels are cached are used to manage the parcel cache to use it efficiently. These one or more data structures located outside the contiguous memory in which the parcels are cached are also used to defragment the parcel cache.

BRIEF DESCRIPTION OF THE DRAWINGS

FIG. 7 is a block diagram illustrating usage of one of the buffers in FIG. 6.

FIG. 8 is a diagram showing the contents of the header pool of FIG. 7 and an associated hash table used therewith.

DETAILED DESCRIPTION OF THE PRESENTLY PREFERRED EMBODIMENTS

I. Navigation System—Overview

Figure 1:
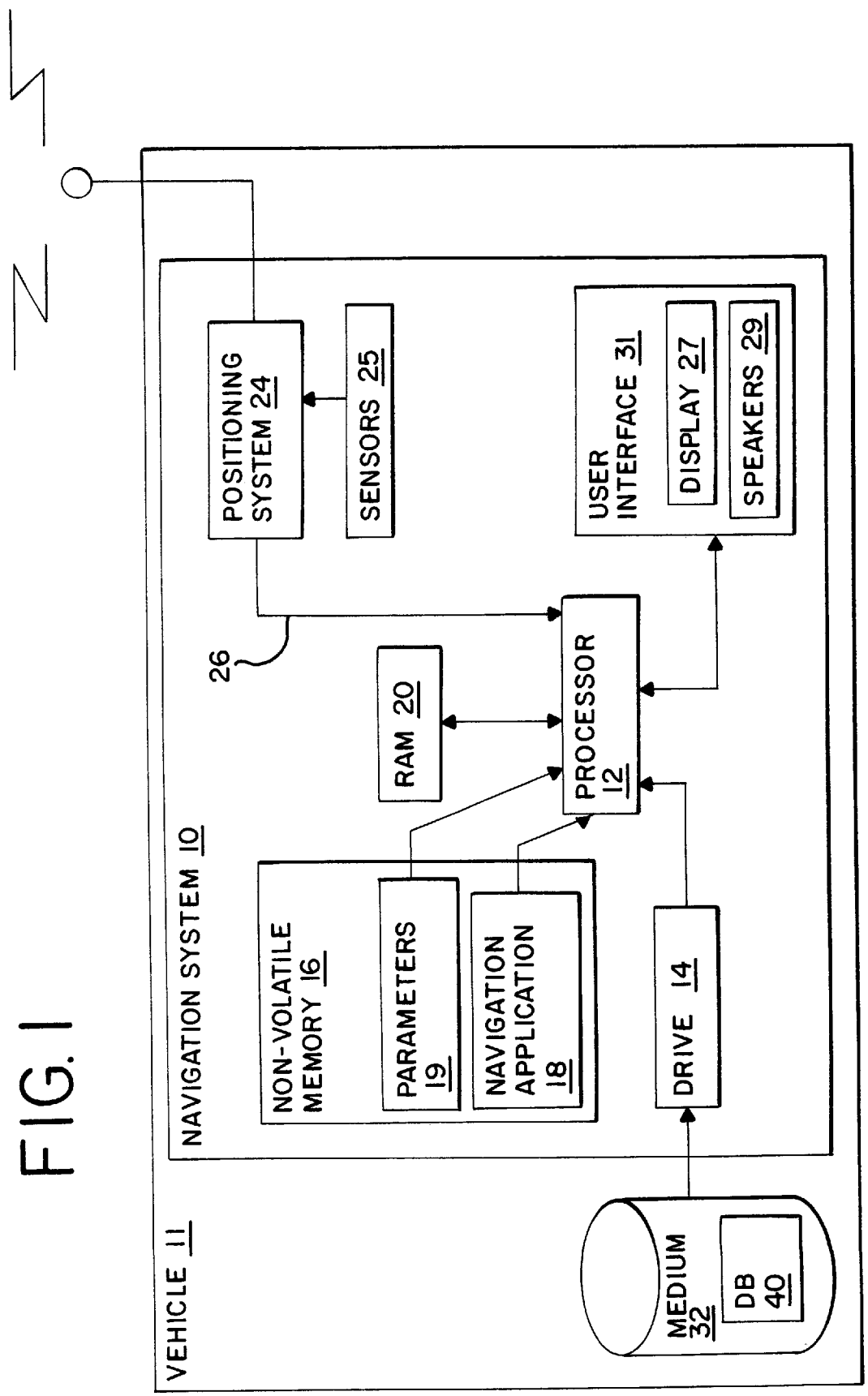
FIG. 1 is a block diagram illustrating a navigation system

Referring to FIG. 1, there is a block diagram of a navigation system 10. The navigation system 10 is installed in a vehicle 11, such as a car or truck, although in alternative embodiments, the navigation system 10 may be located outside of a vehicle or may be implemented in various other platforms or environments, as described below.

Referring to the embodiment illustrated in FIG. 1, the navigation system 10 is a combination of hardware and software components. In one embodiment, the navigation system 10 includes a processor 12, a drive 14 connected to the processor 12, and a non-volatile memory storage device 16 for storing a navigation application software program 18, as well as other information, such as configuration parameters 19. The processor 12 may be of any type used in navigation systems, such as 32-bit processors using a flat address space, such as a Hitachi SH1, an Intel 80386, an Intel 960, a Motorola 68020 (or other processors having similar or greater addressing space). Processor types other than these, as well as processors that may be developed in the future, may also be suitable.

The navigation system 10 may also include a positioning system 24. The positioning system 24 may utilize GPS-type technology, a dead reckoning-type system, or combinations of these, or other systems, all of which are known in the art. The positioning system 24 may include suitable sensing devices 25 that measure the speed, direction, and so on, of the vehicle. The positioning system 24 may also include appropriate technology to obtain a GPS signal, in a manner which is known in the art. The positioning system 24 outputs a signal 26 to the processor 12. The signal 26 may be used by the navigation application software 18 that is run on the processor 12 to determine the location, direction, travel distance, speed; etc., of the navigation system 10.

The navigation system 10 also includes a user interface 31. The user interface 31 includes appropriate equipment that allows the end-user to input information into the navigation system. This input information may include a request to use the navigation features of the navigation system. For example, the input information may include a request for a route to a desired destination. The input information may also include other kinds of information, such as configuration information. The equipment used to input information into the navigation system may include a keypad, a keyboard, a microphone, etc., as well as appropriate software, such as a voice recognition program. The user interface 31 also includes suitable equipment that provides information back to the end-user. This equipment may include a display 27, speakers 29, or other means.

The navigation system 10 uses a map database 40 stored on a storage medium 32. The storage medium 32 is installed in the drive 14 so that the map database 40 can be read and used by the navigation system. The storage medium 32 may be removable and replaceable so that a storage medium with an appropriate map database for the geographic region in which the vehicle is traveling can be used. In addition, the storage medium 32 may be replaceable so that the map database 40 on it can be updated easily. In one embodiment, the geographic data may be published by Navigation Technologies of Sunnyvale, Calif.

In one embodiment, the storage medium 32 is a CD-ROM disc. In an alternative embodiment, the storage medium 32 may be a PCMCIA card in which case the drive 14 would be substituted with a PCMCIA slot. Various other storage media may be used, including fixed or hard disks, DVD (digital video disks) or other currently available storage media, as well as storage media that may be developed in the future. The storage medium 32 and the geographic database 40 do not have to be physically provided at the location of the navigation system. In alternative embodiments, the storage medium 32, upon which some or all of the geographic data 40 are stored, may be located remotely from the rest of the navigation system and portions of the geographic data provided via a communications link, as needed.

Figure 2:
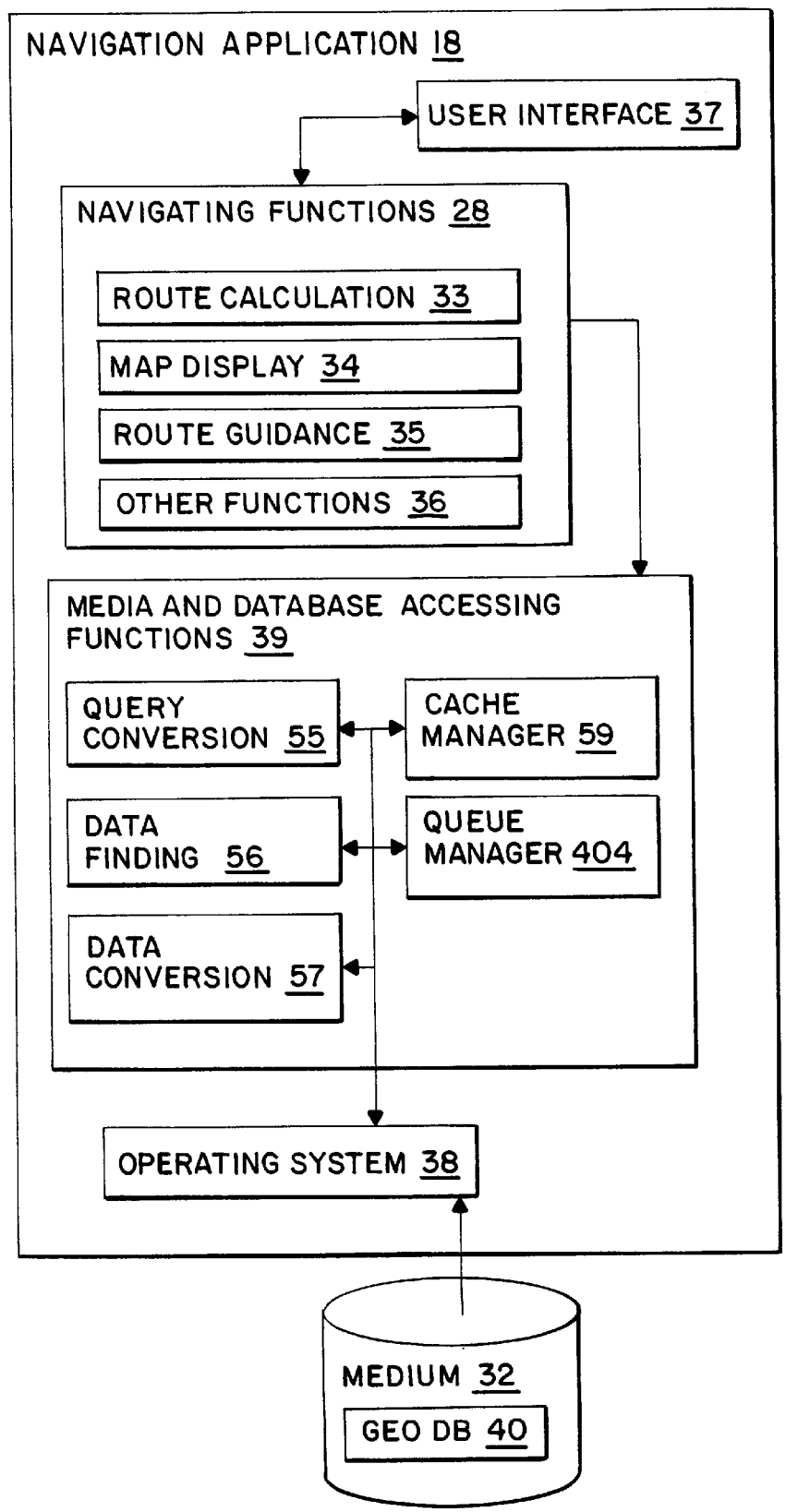
FIG. 2 is a block diagram illustrating parts of the navigation application software of FIG. 1.

Referring to FIG. 2, the navigation application 18 includes software programming that provides separate navigation functions (or subprograms) 28. These navigation functions 28 include, for example, a route calculation function 33, a map display function 34, and a route guidance function 35 (wherein detailed directions are provided for reaching a desired destination). The navigation application program 18 may include other functions or subprograms 36 in addition or alternatively to these, such as a vehicle positioning (e.g., map matching) function. Although these navigation application functions 28 are represented as separate subprograms or applications within the navigation application program 18, these functions 28 may be combined or otherwise provided. The navigation application program 18 also includes user interface programming 37 that supports the user interface equipment 31 (in FIG. 1). For example, this user interface programming 37 may provide for the graphical display of information to the end-user via the user interface 31, the display of menus, prompts, and so on. The navigation system 10 may also include an operating system program 38. The navigation application 18 may also include specific functions 39 that access the geographic database 40. In a preferred embodiment, these functions 39 are located between the various navigation applications 28 and the geographic database 40, or more particularly between the navigation functions 28 and the operating system 38. These functions 39 may include memory management functions, such as a cache manager function 59 and a queue manager function 404, that facilitate sharing access to the geographic database 40 among the navigating functions 28.

II. Geographic Database a. Overview

The geographic data 40 are stored on the medium 32 in the form of one or more computer-readable data files or databases. The geographic data 40 may include information about the positions of roads and intersections in or related to a specific geographical region, and may also include information about the attributes of the roads and intersections, such as one-way streets and turn restrictions, as well as other information, such as street addresses, hotels, restaurants, museums, stadiums, offices, automobile dealerships, auto repair shops, etc. The coverage region of the geographic database 40 may include a metropolitan area, such as Chicago and its suburbs, New York and its suburbs, Los Angeles and its suburbs, or alternatively, the regional area may include an entire state, such as California, an entire country, such as the United States, or more than one country, such as Germany, France, and Italy, or combinations of these. More than one region may be stored on a storage medium.

There are several factors that can affect the operation and performance of the navigation functions 28 in the navigation application program 18 when using geographic data 40 on the storage medium 32. In order to provide a reasonably high level of functionality, a relatively large database may be provided. Storage media, such as CD-ROM discs or PCM-CIA cards, are capable of handling databases of the size and complexity sufficient to provide suitable functionality. However, accessing these types of media can be relatively slow. Because navigation systems may be installed in vehicles or may be hand-held, the hardware resources of the navigation system may be limited. For example, these kinds of navigation systems may have limited memory and relatively slow media access rates. Due to the limited memory resources of these navigation systems, it is necessary to load geographic data as needed from a storage medium, such as a CD-ROM disk, into the memory of the navigation system for use by the navigation application program. Unfortunately, as mentioned above, media access in these types of systems may also be relatively slow.

To address the constraints imposed by limited navigation system resources, techniques have been devised or implemented to improve navigation system performance by organizing, structuring, or arranging the geographic database or the data in the database in particular ways. Because a navigation system uses geographic data in certain known and expected ways to perform known functions, the geographic data can be organized, structured, or arranged in a manner that facilitates their use in these known ways by the navigation system.

Navigation application programs may also be run on computer platforms that have relatively more memory resources and faster I/O, such as personal computers or geographic database servers accessible over networks. Although these platforms may have more and faster resources, the considerations related to the efficient use of geographic data still apply, but on a different scale. With these types of platforms, even greater functionality can be provided if the geographic database can be formed and used efficiently.

b. Parcelization

Included among the techniques that can be used to facilitate the use of geographic data by navigation systems is parcelization. Assuming that all the data records for a given entire geographic region cannot be loaded into the memory of the navigation system at the same time, due to limited memory resources of the navigation system in which the navigation application program is being run, it would be desirable to load into memory only those data that are needed to perform a desired function. In order to accomplish this, data in the geographic database 30 are organized in a manner that minimizes the amount of time required to access and read data from the medium in order to perform a navigation function. To provide for this, the data are organized into parcels. When data are parcelized, the plurality of data records that together comprise the geographic data are grouped together into separate groups or parcels. A parcel of data is established so that all the data in the parcel are accessed together at the same time from the medium. This may relate to the quantity of data that can be accessed in a single disk access, although it may be related to some other factor. For some types of media such as a CD-ROM discs, a parcel may be established to be a 16 Kilobyte quantity of data. (Other sizes of data may be used including 1 K, 2 K, 4 K, 8 K, 32 K, and so on. The portions of the geographic database are generally formed in sizes of $2^n$ Kilobytes, wherein n is an integer value greater than 1.)

In conjunction with parcelization, another way that some of the geographic data can be organized to facilitate their use is to organize the data spatially. When geographic data are organized spatially, features that are close together physically in the geographic region are represented by data records that are physically (or logically) close together in the database. Geographic data can be both parcelized and spatial organized to take advantage of both these techniques.

For purposes of forming the data into parcels, the data may be first separately organized into different types based upon the navigation functions 28 that access them. Thus, some or all of the navigation functions 28 may have separate collections of the geographic data. Each of the separate collections includes the essential portions of the data needed to perform the respective function, but omits portions that are unnecessary for performing the function. Thus, there may be separate types of data in the geographic database, such as routing, cartographic (map display), maneuver (route guidance), points of interest, names, and so on, associated with one or more of the navigation functions 28.

Some of these kinds of data may be parcelized spatially in order to facilitate use of the data by the navigation functions 28. Spatially-parcelized data are arranged so that the data that represent geographically proximate features are located logically and/or physically proximate in the database 40 and/or on the medium 32. For some of the navigation application functions, spatial parcelization of their respective data provides for reading closely related geographic data from the medium more quickly and loading related geographic data into memory where they can be used. This kind of organization minimizes accessing of the storage medium 32 and may speed up operation of these navigation functions. The routing, cartographic, and point of interest data are included among the kinds of data that may be spatially organized.

There are a number of different procedures that can be used for parcelizing spatially organized geographic data. For example, a simple parcelization method may provide for separating the geographic data into a plurality of parcels or groupings wherein the data in each parcel represent features encompassed within a separate one of a plurality of regular sized rectangles which together form a regular, rectangular grid over the geographic region. Another method for parcelization is to separate the data into parcels encompassed within rectangular areas where each of the rectangles is formed by a bisection of rectangles encompassing parts of the region until a parcel size below a maximum threshold is obtained. In addition, parcelization procedures are disclosed in the copending application Ser. No. 08/740,295, filed Oct. 25, 1996, the entire disclosure of which is incorporated by reference herein, and parcelization procedures are also described in the copending patent application Ser. No. 08/935,809, filed Sep. 5, 1997, the entire disclosure of which is incorporated by reference herein. Still another method of parcelization to which the disclosed subject matter can be applied is described in U.S. Pat. No. 4,888,698.

Figure 3:
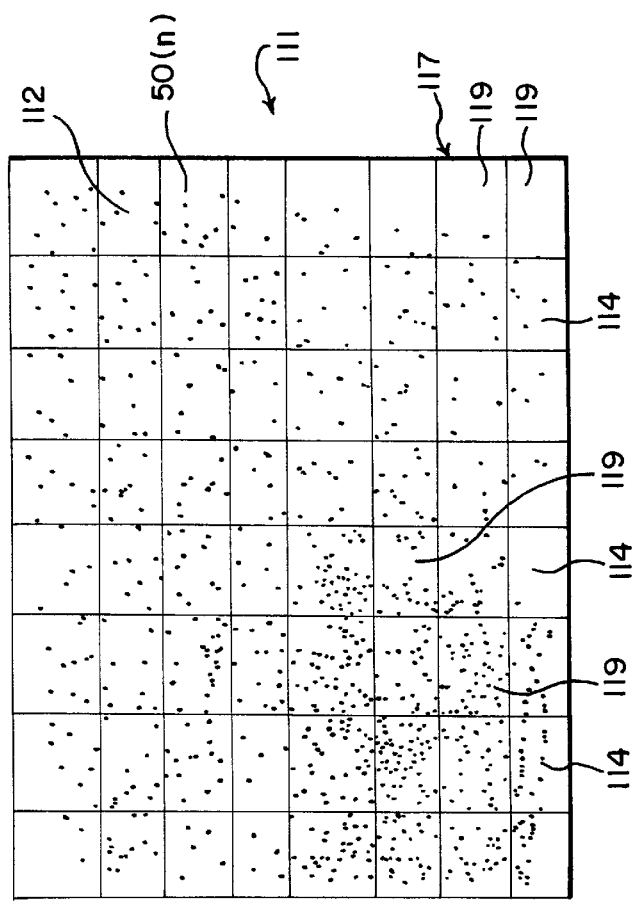
FIG. 3 shows a map of a geographic region used to illustrate application of a parcelization method to spatially organized geographic data.

Parcelization of spatially organized data is illustrated with reference to FIGS. 3 and 4. FIG. 3 shows a map 111 of a geographic region 112. A plurality of positions 114 (represented by the dots or points) are shown to be located on the map 111. Each of the positions 114 represents a place or point in the geographic area 112 at which there is located a feature about which information is included in the geographic database 40 of FIGS. 1 and 2. For example, the positions 114 may correspond to the physical locations of end points of road segments, points along road segments, points-of-interest (such as hotels, civic centers, etc.), and so on, which are represented by the data in the geographic database 40. Each of these locations 114 has a unique physical location (latitude, longitude, and optionally absolute or relative altitude) and each of the locations 114 can be uniquely identified by its two dimensional (or three dimensional) geographic coordinates (i.e., latitude, longitude, and optionally altitude).

In FIG. 3, a grid 117 overlays the geographic region 112 represented by the map 111. The grid 117 divides the geographic region 112 into a plurality of rectangular areas 119. These rectangular areas 119 may be all the same size or may have different sizes depending upon the procedure used for parcelization. The grid lines of the grid 117 represent the boundaries of rectangular areas 119. The locations of the boundaries may depend on the parcelization procedure used. In general, when using any of the procedures for spatial parcelization, the data records of a particular type of data which represent features that are encompassed within each rectangular area 119 are grouped together in a separate parcel of data. Therefore, each parcel 120 of spatially organized data (in FIG. 4) includes one or more data records which represent the geographic features encompassed within a separate one of the plurality of rectangles 119 (as shown in FIG. 3).

Figure 4:
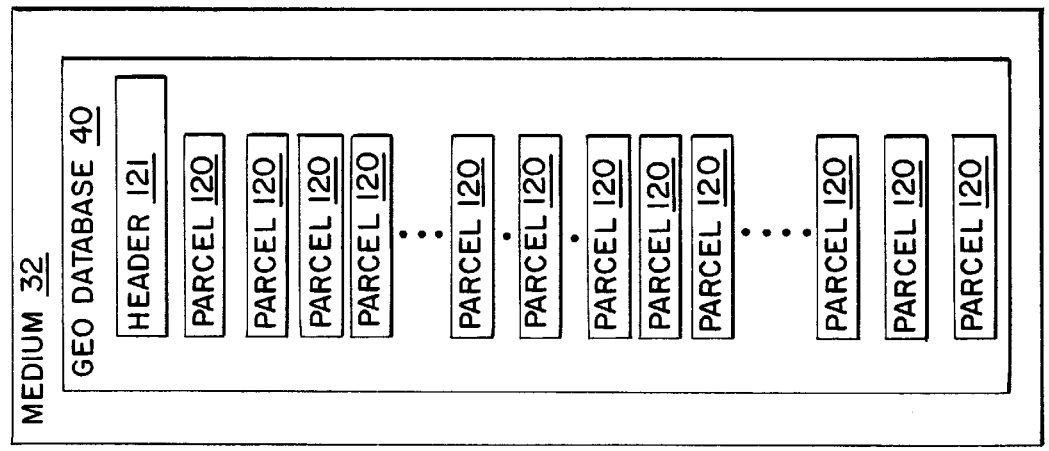
FIG. 4 is a diagram showing the arrangement of parcels of data in the geographic database of FIGS. 1 and 2 according to the parcelization method illustrated in FIG. 3.

As shown in FIG. 4, the parcel 120 is then stored to form the database 40 so that the data in each parcel 120 are logically and/or physically grouped together. Since the parcel represents the quantity of data that is accessed at the same time from the medium by the navigation system, when a parcel of data is accessed, all of its data records are read into the memory of the navigation system at the same time. With reference to the map 111 of FIG. 3, this means that all the data records of a spatially organized type of data encompassed within each rectangle 119 are accessed together as a group. It can be appreciated that for certain kinds of navigation functions, it is desirable to have in memory at the same time all the data records that represent features that are physically close together in the geographic region.

As the parcels 120 are formed for these types of data, the parcels are ordered. Various types of ordering may be used. In general, it is preferred that the parcels be ordered in a manner that minimizes searches for data. One way to order spatially organized parcels is to use a depth-first ordering from a kd-tree index within each type of data. This provides an ordering similar to Peano-key ordering. Parcels may be stored on disk (i.e., medium 32 in FIGS. 1 and 2) in this approximate Peano key order. One or more indices, such a kd-tree, can be used to access parcels spatially. This index is useful for initial location of an arbitrary position, such as when a program in a navigation system initially locates the map data corresponding to a current vehicle position. As the parcels 120 are ordered, each may also be assigned a unique parcel identifier (e.g., a "parcel ID"). The parcel ID may be used to identify the parcel and/or its location on the medium.

As mentioned above, some kinds of data are not spatially organized (i.e., each parcel of non-spatially organized data does not necessarily correspond to any of the rectangular areas 119 in FIG. 3.) For example, data that represents the names of streets may be organized alphabetically instead of spatially. Data that represents administrative or political entities, such as countries, states, cities, and so on, are other kinds of data that are not spatially organized. For example, data that represents administrative or political entities may be organized by administrative hierarchy. In a present embodiment, these non-spatially organized types of data are parcelized as well.

III. Accessing The Geographic Database

The various separate navigation functions 28 of the navigation application 18 use the data in the geographic database 40 stored on the storage medium 32 in order to provide useful navigation features to the end-user of the navigation system 10. As mentioned above, the navigation application 18 includes functions 39 that access the geographic database 40. These accessing functions 39 work with the various navigation applications 28 and the geographic database 40. More particularly, these functions 39 may operate between the navigation functions 28 and the operating system 38. The data in the geographic database 40 on the medium 32 may be compressed, arranged, organized, parcelized, and indexed on the medium 32 to facilitate their use for various navigation functions. The accessing functions 39 deal with the organization and arrangement of the geographic database 40 on the storage medium 32 in order to return data for use by the navigation functions 28.

Included among the accessing functions 39 is a query conversion function 55. This function 55 may be used to convert a query for data from the navigation functions 28 into an identification of parcels on the medium that contain the requested data. This query conversion function 55 may utilize data finding functions 56. These data finding functions 56 may utilize various indices, some of which may be stored on the medium, as well as information about the file structure of the geographic data on the medium, to find the requested data. The data finding function 56 may determine an address location or file offset at which the desired parcel of data is located on the medium. The data finding function 56 may also determine the location of the desired data within the parcel. The navigation application may also include a data conversion function 57. The data conversion function 57 may provide for decompressing the data and transforming the data into a format that can be used readily by the navigating functions 28. The data conversion function may also provide for conversion from different versions or releases of the geographic database 40 as well as provide for updating the geographic database. The accessing functions 39 may also provide for an acceptable level of performance in navigation systems that use the geographic database 40, provided that certain minimum resources are provided by the platform of the navigation system. Moreover, the access functions 39 may provide for efficiently utilizing additional resources above the minimum to provide even greater performance. In one embodiment, the accessing functions 39 use approximately 128 K of memory (aside from the parcel cache memory, described below), although in alternative embodiments, the access functions may use even less, such as 64 K, or even 16 K.

In another alternative embodiment, all the functions of accessing the geographic data may be implemented by the respective navigation functions 28 instead of providing separate functions for this purpose. In this alternative, the operation of these accessing functions would be similar.

IV. Parcel Cache a. General

One way to provide improved performance in a navigation system is to implement a parcel cache in memory. Referring to FIG. 2, during operation of the navigation system, the various navigating functions 28 formulate queries that identify the geographic data needed to perform the functions. These queries are used by the data accessing functions 39 to identify which of the parcels 120 (in FIG. 4) on the medium 32 contain the data needed by the navigating functions 28. Once these parcels 120 are identified, they are accessed and read by the data accessing functions 39. Unfortunately, as mentioned above, accessing the medium 32 for data is relatively slow. Once the parcels of data are read from the medium 32, some or all of the data in the parcels may have to be de-compressed and provided to the navigation functions 28 in order to satisfy the query.

With respect to some queries for data from the navigating functions 28, there may be a need for data contained in more than one parcel. In addition, with respect to some queries for data from the navigating functions 28, there may be a need for data from a parcel that has previously been accessed. The need for data from a parcel that has previously been accessed may occur with certain navigation functions that access data spatially. For example, when the route calculation function 33 is being performed, multiple possible paths may be explored from the location of a roadway intersection in the geographic region in order to determine which path is optimal. Exploration of these multiple possible paths may require examining features that are located relatively close to the intersection, followed by examining features that are located relatively far away from the intersection, and then followed by examining again features that are located relatively close to the intersection. Since the data that represent these features may be spatially organized, reexamination of data that represent features that are proximate to each other may require accessing the same parcel that had been previously accessed. For another example, an index parcel may be needed repeatedly to locate different database records, such as the global kd-tree parcels that are needed to locate parcels of spatially organized data. Each time a parcel has to be identified, located, accessed, and read, a relatively significant amount of time is expended. If the same parcel has to be identified, located, accessed, and read, more than once, this expenditure of time is multiplied. Under these circumstances, if the parcel does not have to be located on the medium, accessed, and read more than once, significant time can be saved thereby improving system performance.

Figure 6:
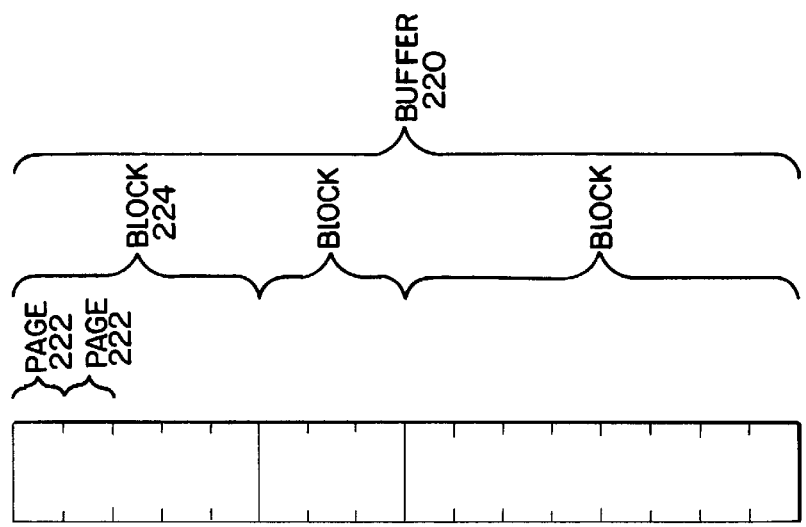
FIG. 6 is a diagram illustrating one of the buffers in the parcel cache of FIG. 5.
Figure 5:
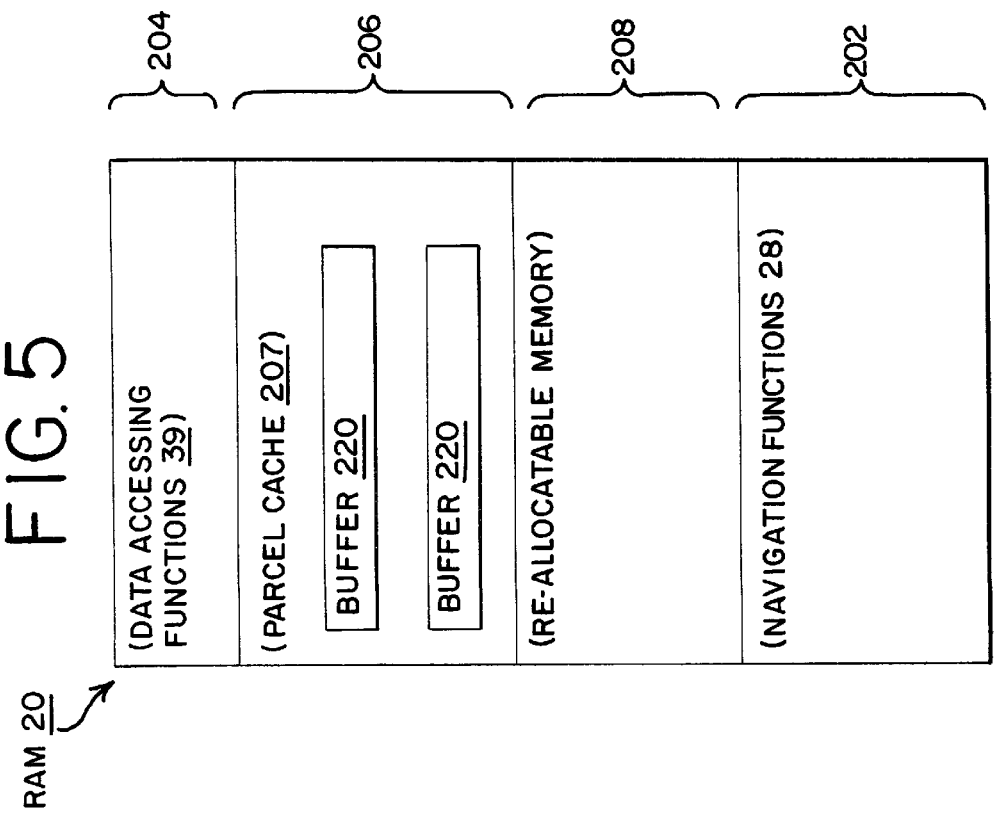
FIG. 5 is a diagram illustrating the utilization of memory resources in the navigation system of FIG. 1.

To improve performance of the navigation system, a cache is provided in the memory of the navigation system specifically for storing a number of parcels of geographic data that have been accessed and read from the medium. FIGS. 5–7 illustrate aspects of the parcel cache. Storing parcels of geographic data in a parcel cache supports the navigating functions 28 by maintaining a number of geographic parcels in memory ready for use. The parcel cache accommodates those navigation functions that need to re-examine data which have previously been examined. Because some navigation functions need to access the same parcel more than once over a relatively short time period, having the parcel in memory ready to use avoids the relatively large delay associated with accessing the parcel from the medium again. The parcel cache may also be used to store parcels of geographic data that a navigation function predicts will be needed soon. Also, the parcel cache may be used to contain recently used parcels that one of the navigation functions 28, or another function, indicates should not be discarded.

In a present embodiment, the parcel cache is used to contain all parcels of data that are read from the medium. If a parcel needed to satisfy a query from a navigation function 28 is not in the parcel cache, the parcel is read from the medium into the parcel cache from which it is then used by the accessing functions 39 to deliver the data to the navigation functions 28 to satisfy a query. Referring to FIG. 2, the formation and operation of the parcel cache may be performed by a cache manager function 59. The cache manager function 59 may be included among the data accessing functions 39.

Referring to FIG. 5, there is a diagram illustrating the memory utilization in the navigation system 10. A portion 202 of the RAM 20 is used by the navigation functions 28 and another portion 204 is used by the accessing functions 39. These portions 202 and 204 may be determined at the time of initialization of the navigation system based upon the total amount of installed memory in the system. In addition, a portion 206 of the memory 20 is used for a parcel cache 207, as described further below. Still another portion 208 of the memory 20 may be re-allocatable. Some or all of this re-allocatable portion 208 may be used alternately by the navigation functions 28 or the accessing functions 39, or as parcel cache 207, during runtime of the navigation system based on the needs of the navigation system.

The parcel cache 207 includes one or more buffers 220. Each buffer 220 represents a portion of the memory 20 of the navigation system. Referring to FIG. 6, there is a diagram of one of the buffers 220 that forms the parcel cache 207 of FIG. 5. There are three fundamental units of the cache 207: pages 222, blocks 224, and buffers 220. The relationship of these items is shown in FIG. 6. There may be multiple buffers 220, similar to the buffer shown in FIG. 6, chained together. One or more blocks 224 are contained within each buffer 220, the actual number depends on cache usage. Each block 224 is formed of one or more pages 222. Each block is a contiguous range of memory that either stores a parcel or is a maximal contiguous range of free memory. The size of a page 222 is fixed and every parcel has a size which is a multiple of the page size. The page size may be chosen to be the smallest addressable quantity of the medium, for example, 2 K for CD-ROM. Blocks 224 are in one of two states: free or in-use. In-use blocks contain parcel data or are currently being read into.

b. Size of Parcel Cache

The size of the parcel cache depends upon several factors. One factor that affects the size of the parcel cache is the size(s) of the parcels. The size of the parcel cache relative to the size of the parcels determines how many parcels can be contained in the parcel cache. As mentioned above, in some embodiments, the parcels are stored in regular sizes on the medium, e.g., 2 K, 4 K, 8 K, 16 K, 32 K, and so on. Accordingly, the size of the cache defines the number or parcels in each of these sizes that can be stored. For example, a 384 K parcel cache can store a maximum of 24 parcels each 16 K in size. Correspondingly fewer parcels of larger sizes can be stored and correspondingly more parcels of smaller sizes can be stored. In a present embodiment, the geographic database 40 on the medium 32 contains parcels of more than one size. Some parcels are 32 K, other parcels are 16 K, other parcels are 8 K, and so on. Thus, in a present embodiment, the parcel cache 207 is used to hold parcels of varying size that are read from the physical medium 32.

Another factor that affects the size of the parcel cache is the total available memory resources of the navigation system. Navigation systems with limited memory resources may provide a relatively small portion for the parcel cache. Navigation systems with greater memory resources may provide relatively more memory for parcel cache.

Another consideration that affects the amount of memory to be provided for parcel cache relates to the search algorithm(s) in the navigation functions from which the requests for parcels originates. Different search algorithms may implement reexamination of previously examined data in different ways. For example, some search algorithms may require more reexamination of many previously considered parcels whereas other search algorithms may require reexamination of only a few previously considered parcels. Additionally, some search algorithms may implement reexamination of previously considered parcels over a greater period of time, i.e., they may go back further to reexamine parcels that were originally examined a relatively many parcels ago.

Still another consideration that affects the amount of memory used for the parcel cache is that some search algorithms implement "pre-cache" search techniques. "Pre-caching" refers to storing parcels in the parcel cache before the data in the parcels are actually needed by the navigation application function. To pre-cache, a navigation function implements an algorithm that predicts which data will be needed before they are actually needed based upon a certain detected pattern of operation. Based on this detected pattern, one of the navigation functions 28 requests that certain data be accessed thereby causing the parcel that contains the data to be stored in the parcel cache ready for use.

Still another consideration that affects the amount of memory used for the parcel cache is the relative sizes of the memory allocated to the parcel cache 207 and the memory allocated to the navigation application functions 28. A relatively large allocation of memory for parcel cache 207 may not necessarily improve performance of a navigation system if the amount of memory available for the navigation functions 28 is constrained, and vice versa.

Still another consideration is that with a small parcel cache, it may be required to store parcels in compressed form in the cache, and then decompress a parcel each time data from the parcel are needed. With a larger parcel cache, parcels may be stored in decompressed form in the cache.

Taking the above factors into account, 384 K has been shown to be reasonable size for the parcel cache 207. In alternative embodiments, the parcel cache may be smaller than 384 K. For example, in one alternative embodiment, the amount of memory used for the parcel cache may be 256 K (which would hold a maximum of sixteen 16 K parcels), or even 128 K. A parcel cache larger than 384 K may be provided. In general, a larger parcel cache provides greater performance benefits. There is no fixed upper limit as to the amount of memory that may be used for parcel cache except that the amount of memory allocated for parcel cache should not constrain the memory requirements of the navigation application functions 28. For example, a relatively large cache of 1 M (which would hold-approximately 64 16K parcels) or even several gigabytes may be provided.

c. Parcel Header Pool and Hash Table

Storing parcels in a parcel cache can provide advantages both for navigation systems that have limited resources as well as navigation systems that have greater resources. However, using the parcel cache efficiently can yield further improvements in navigation system performance. For example, as mentioned above, parcels may be of different sizes, e.g., 8 K, 16 K, 32 K, and so on. Thus, given a parcel cache of a given size, allocating the cache to the parcels of different sizes can affect the number of parcels that can be stored. Another consideration is that the parcels in the cache are being changed continuously. Thus, if room for a 32 K parcel is needed and two non-contiguous 16 K spaces are available, a means is required to coalesce the available spaces for use by the 32 K parcel. Still another consideration relates to finding the parcels in cache. In a relatively large parcel cache (e.g., of 1 M) there may be several dozens of parcels which are continuously being changed. Finding a desired parcel quickly would help improve system performance.

To facilitate finding a desired parcel quickly and to manage the parcel cache efficiently, there is provided at least one data structure that identifies information about each of the parcels in the cache and provides an index of the parcels. It is noted that as is common in a multi-tasking or multi-processor system, the integrity of the data structure(s) must be maintained, for example by mutex locking. In a present embodiment, two kinds of data structures are used. A plurality of first data structures is used to include information about each of the parcels in the cache and a second data structure is used in combination with the first data structures to index and find the parcels. Various kinds of data structures may be used for these purposes. As shown in FIGS. 7 and 8, in the present embodiment, a plurality of parcel headers 264 are allocated from a header pool 262 and are used to hold information about each of the parcels in the buffer. These parcel headers 264 are used in combination with a hash table 266.

Referring to FIG. 7, there is shown a buffer 220 of memory used for the parcel cache 207. The buffer of memory 220 represents a contiguous portion of the memory (i.e., a contiguous address range). In one embodiment, the buffer 220 is 384 K in size. The cache manager function 59 (in FIG. 2) allocates a relatively small portion 260 of the buffer 220 for use as a header pool 262. FIG. 8 illustrates the contents of the header pool 262 of FIG. 7. The header pool 262 is comprised of a plurality of parcel headers 264 each of which is associated with a separate parcel in the buffer 220 (in FIG. 7) of the parcel cache 207. In one embodiment, the plurality of parcel headers are organized as an array of allocation structures.

The size of the portion of memory 260 used for the header pool 262 may be determined as a function of the total size of the buffer 220 in which it is located. One way to determine the size of the portion of memory used for the header pool 260 is to determine the size of a remainder of the buffer that is too small to hold a small sized parcel. For example, a buffer of 500 K could hold 31 16 K parcels with 4 K left over. The left over 4 K can be used for the header pool.

Another way to determine the size of the portion of memory 260 to be used for the header pool 262 is to estimate the number of bytes needed for each parcel header and then multiply this number by the maximum number of parcels that can be stored in the buffer 220. For example, in a present embodiment, the header for each parcel may require approximately 40 bytes.

In a present embodiment, a minimum size for the portion of memory 260 used for the header pool 262 is approximately 4 K. This 4 K size is predicated upon a parcel cache size of about 384 K. If a parcel cache of a different size is provided, the portion of memory 260 required for the header pool may change accordingly. For example, if a parcel cache of 1 M is used, a greater portion of memory may be required for the header pool.

Because the parcels contained in the parcel cache 207 may be constantly changing, parcel headers 264 are allocated, as necessary, from the header pool 262 and associated with each parcel in the parcel cache. Some of the information in the parcel header 264 associated with each parcel may change while the parcel is in the parcel cache, as explained below. The cache manager function 59 stores data for the formation of the headers in the header pool as the parcels are stored in the parcel cache. The cache manager function 59 also modifies the data in the parcel headers as the parcels are moved, unlocked, freed, and so on.

Referring to FIG. 8, the hash table 266 is associated with the parcel headers 264 in the header pool 262. The hash table 266 is used to quickly determine whether a parcel is in the parcel cache 207. The hash table 266 maintains a searchable index of the buffer ID's (which are related to parcel ID's) of all the parcels contained in the parcel cache 207. The hash table 266 associates each buffer ID with a pointer 268 to the parcel header 264 associated with the first parcel in the doubly linked list of parcel headers of parcels with the same buffer ID in the header pool 262. Using the hash table 266, the accessing functions 39 (in FIG. 2) can quickly determine whether a needed parcel is already in the parcel cache or must be read from the medium 32. Because the hash table 266 enables the quick identification of the presence and position of parcels in the parcel cache, the parcel cache does not have to be searched linearly.

In a present embodiment, the pointers 268 maintained in the hash table 266 include pointers for finding parcels in all the buffers 220 (in FIG. 6) used for the parcel cache 207. Accordingly, the hash table 266 may not necessarily be located in the same buffer 220 as the parcels or the parcel headers to which it points. In one embodiment, the hash table 266 is located in a portion of one of the buffers 220. Alternatively, the hash table 266 may be located in the portion 204 of the memory 20 (in FIG. 5) used for the accessing functions 39. In one embodiment, the memory for the hash table is carved out of the tail end of the first buffer. Note that in a preferred embodiment, only the first buffer contains a hash table since the hash table persists throughout runtime, while buffers that are allocated after initialization do not persist.

The hash table 266 is allocated during initialization. The size of the hash table 266 varies depending on the memory 206 (in FIG. 5) supplied for the purposes of the parcel cache 207. In one embodiment, it is calculated in the following manner. The cache size is divided by the size of a parcel header plus the size of a page. The resulting integer value is then multiplied by the same constant to find the amount of space remaining in the cache. If the remaining space accommodates a value equal to the buffer cache size divided by 64 K hash buckets, the entire remaining space is used for the hash table. Otherwise, an additional page is used for the hash table. The number of hash buckets is manipulated such that it is not an even number. Ideally this number would be prime, but odd is sufficient.

Each parcel in the parcel cache has a status of either locked or unlocked. If a parcel is locked, it is being used. If a parcel is not locked (i.e., "unlocked"), it is associated with either a free list or a least-recently-used (LRU) list. The unlocked parcels in each list are assigned an order. The status of each parcel as well as order of each unlocked parcel on either the free list or the LRU list is determined by information contained in the parcel header 264 assigned to the parcel. This information is maintained by the parcel cache manager 59.

Figures 9, 10:
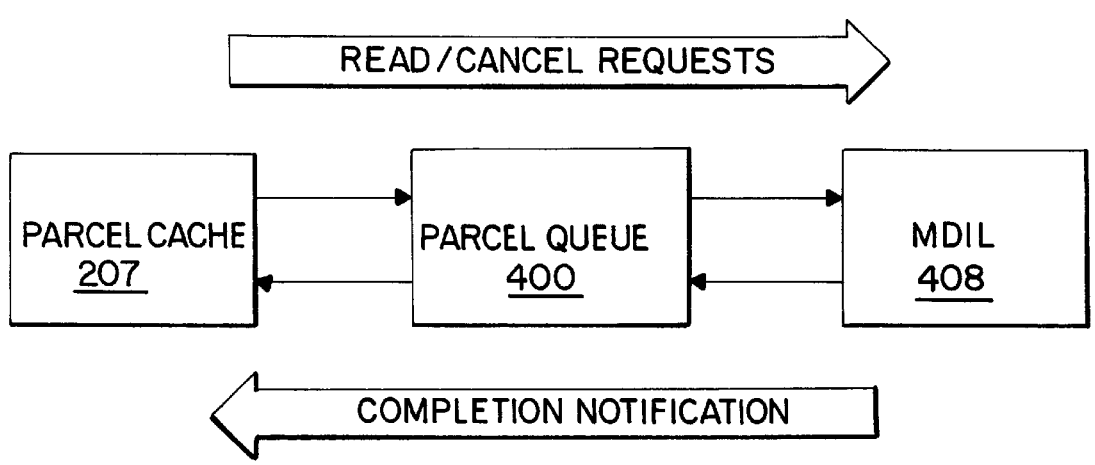
FIG. 9 is a diagram showing the information stored in each parcel header of FIG. 8.
FIG. 10 is a block diagram illustrating data flow between the parcel queue and the parcel cache illustrated in FIGS. 5–7.

FIG. 9 illustrates the structure of one of the parcel headers 264 in the header pool 262 of FIG. 8. The parcel header 264 is a data structure associated with each parcel or free block contained in the block 220. All the parcel headers in the pool 262 may have a similar structure. Each parcel header 264 includes information that facilitates finding and using its associated parcel as well as information that facilitates using the parcel cache. Each parcel header 264 includes the following kinds of data.

First, each parcel header 264 includes data 280 that contains a unique identifier (labeled "BufferID") for the parcel. The data 280 in this field is "0" if the block is free. This BufferID data value may be derived from the parcel ID (e.g., an ID for the parcel on the medium), an ID for the region, or a combination of both. In a preferred embodiment no two buffer ID's 280 are the same in the header pool.

Next, the parcel header 264 includes data 282 (labeled "pPrev") that identifies the header associated with the previous parcel in either the ordered free list or the ordered LRU list. If the bufferID is "0" indicating that the parcel is on the free list, this item of data 282 identifies the previous header on the free list. If the bufferID is other than "0" indicating that the parcel is on the LRU list, this item of data 282 identifies the previous header on the LRU list.

Next, the parcel header 264 includes data 284 (labeled "pNext") that identifies the header associated with the next parcel in either the ordered free list or the ordered LRU list. If the bufferID is "0" indicating that the parcel is on the free list, this item of data 284 identifies the next header on the free list. If the bufferID is other than "0"indicating that the parcel is on the LRU list, this item of data 284 identifies the next header on the LRU list. (pPrev 282 and pNext 284 are used to chain their respective headers into either the free list or LRU, depending on the block context.)

Then, the parcel header 264 includes data 286 (labeled "pHashPrev") that identifies the previous parcel header in the doubly linked list of parcel headers of parcels with the same buffer ID.

The parcel header 264 includes data 288 (labeled "pHashNext") that identifies the header associated with the next parcel header in the doubly linked list of parcel headers of parcels with the same buffer ID.

The parcel header then includes data 290 (labeled "pAddrPrev") and data 292 (labeled "pAddrNext") that chain the header into a list sorted by memory address. This aids in defragmenting and coalescing, as explained below.

Next, the parcel header 264 includes data 294 (labeled "pPages") that points to the address within the buffer at which the parcel data is located. Referring to FIG. 6, this data 294 may point to the page 222 within the block 224 at which the parcel is located. If the block is free, this data 294 points to the free memory block.

The parcel header 264 then includes data 296 (labeled "pCache") that references the buffer containing the parcel.

The parcel header then includes data labeled 298 (labeled "pTurnstile") that points to the turnstile object for the parcel queue, as explained further below. This information is used to eliminate searching for a parcel when a second request for the same parcel occurs while I/O is in progress.

The parcel header 264 then includes data 300 labeled (labeled "pages") that defines the size of the block.

Next, the parcel header 264 includes data 302 (labeled "lockCount") that indicates whether the parcel can be moved or discarded. When this value is other than zero, the parcel is not to be moved or discarded. This item of data is incremented by one each time a query for the parcel is made and decremented by one each time the query for the parcel is satisfied. Thus, if more than one request for a parcel is made, this item of data assures that the parcel will be not be discarded until all the requests for the parcel have been satisfied.

The parcel header 264 then includes a data field 306 (labeled "bLoaded") that is set when the block contains valid data. This value is not valid while the parcel header is on the free list. When this item of data ("bLoaded") 306 in a parcel header is cleared, it is an indication that the associated block is currently being read into.

Finally, the parcel header 264 includes data 308 (labeled "bWired") that indicates whether the parcel data is available for swapping, regardless of whether it is locked. If this data field 308 is set, the parcel may not be swapped out even if it is unlocked.

d. Parcel Queue

Figure 11:
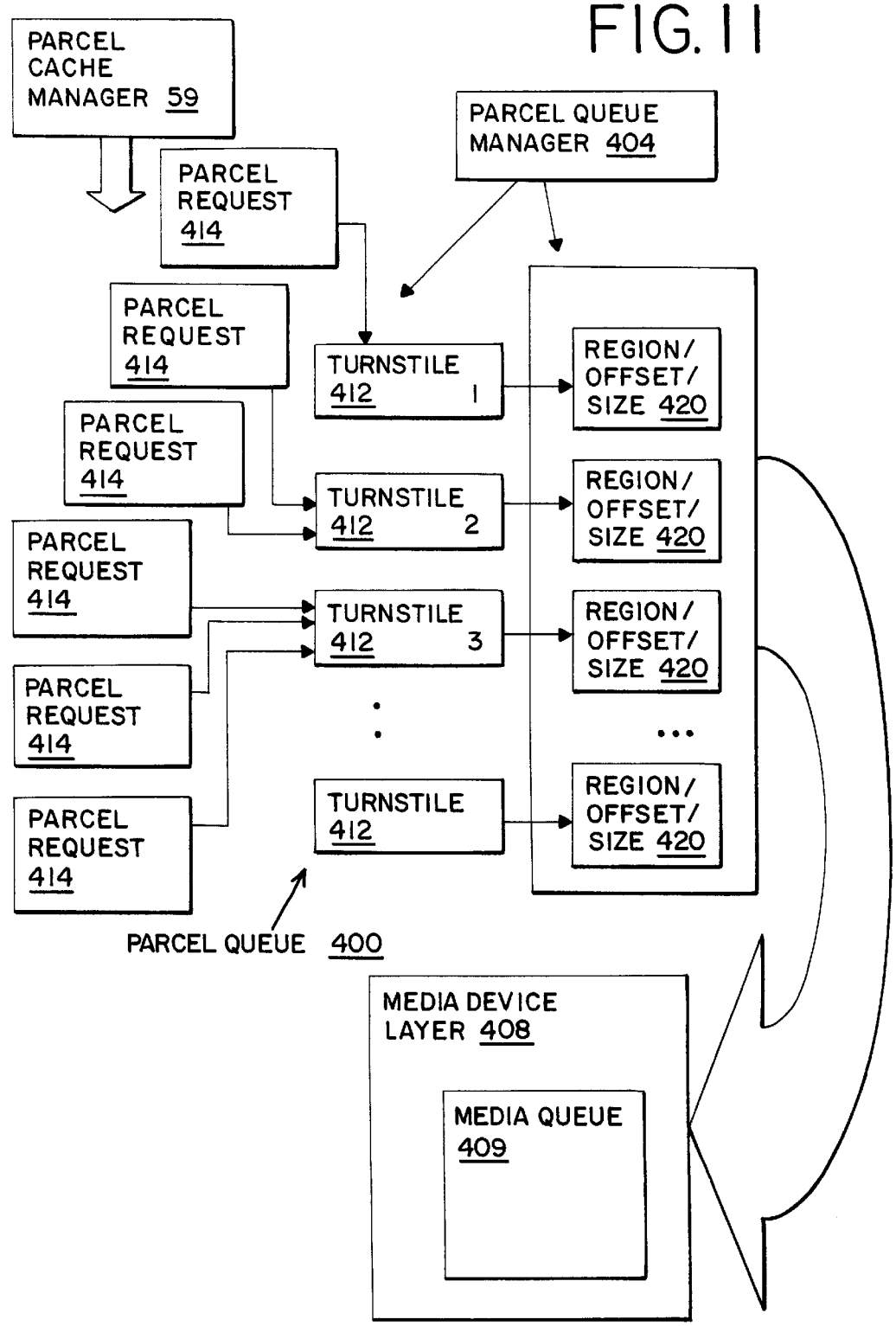
FIG. 11 is a block diagram illustrating components of the parcel queue shown in FIG. 10.

As mentioned above, if a parcel of data needed for a query from the navigation functions 28 is not present in the parcel cache 207, the parcel is read off the medium into the parcel cache 207 from which it is then used by the accessing functions to satisfy the query from the navigation functions 28. Referring to FIGS. 10 and 11, to obtain parcels from the medium, the parcel cache 207 works in conjunction with a parcel queue 400. The parcel queue 400 is formed and managed by a parcel queue manager function 404 (in FIG. 2). As illustrated in FIG. 2, the parcel queue manager 404 may be among the accessing functions 39. Communication between the parcel cache and parcel queue is bi-directional. The parcel queue 400 is used to contain requests for parcels for the parcel cache 207. The parcel queue manager 404 uses the parcel queue 400 to pass the requests for parcels forward to a media device software layer 408 which is used to interface with the media device (such as drive 14 in FIG. 1) that accesses the storage medium 32.

In a present embodiment, the parcel queue manager 404 provides features that make the accessing of parcels from the medium efficient. For example, the parcel cache 207 may receive multiple requests for the same parcel. The parcel queue manager 404 filters parcel requests so that the same parcel is not read twice. The parcel queue manager 404 recognizes these multiple requests and passes only a single request to the media device layer 408.

Referring to FIG. 11, the parcel queue manager 404 maintains the parcel queue 400. A corresponding queue 409 is located in the media device layer 408. The parcel queue manager 404 uses two data objects in managing the parcel queue 400. These data objects include turnstile objects 412 and parcel request objects 414. Turnstile objects 412 are used for synchronizing requests for parcels forwarded to the media device layer 408. One turnstile object 412 is allocated for each request in the corresponding queue 409 in the media device layer 408.

When a parcel needed by a navigating function is not in the parcel cache 207 (as determined by searching the hash table 266), the parcel cache manager 59 creates a parcel request object 414. The parcel request object 414 is provided to the parcel queue 400 where a turnstile object 412 is formed by the parcel queue manager 404 and associated with the parcel request object 414. The turnstile object 412 returns a handle to the parcel request object 412. If a turnstile object 412 for the same parcel has already been created in the parcel queue 400 to satisfy a prior parcel request 414, the second parcel request 414 and any subsequent parcel requests 414 for the same parcel are linked to the same turnstile object 412. Thus, in the case where multiple requests are made for the same parcel, multiple parcel request objects 414 are allocated and chained to a single turnstile object 412, as shown in FIG. 11. As mentioned above, a handle used to reference the parcel request is returned by the turnstile object 412 so that even though a requested parcel is only read once, all the functions that requested it will be able to use the parcel once it is in the parcel cache.

Using the information in the turnstile objects 412, the parcel queue manager 404 forwards the requests for parcels to the media queue 409 in the media device layer 408. Specifically, the parcel queue manager 404 forwards requests for particular region/offset/size combinations 420 to the media device layer 408. The region portion of the region/offset/size combination is used to identify which file, of one or more files stored on the medium each of which may represent a separate region, is to be read. The offset portion of the region/offset/size combination is used to identify the position in the identified region file at which the desired parcel data begins. The size portion of the region/offset/size combination is used to identify how much data to read starting from the offset position in order to read the desired parcel.

FIG. 11 shows the parcel queue 400 and transaction/request layout for three parcels. Parcel 1 has had one request made for it, parcel 2 has two requests made for it, and parcel 3 has three made for it. (There may be additional requests in addition to these for other parcels.) Using the parcel queue 400, these six parcel requests 414 associated with the three turnstile objects 412 result in only three requests in the media queue 409.

The media device isolation layer 408 receives the requests for parcels (in terms of region/offset/size combinations) from the parcel queue 400. In the media device isolation layer 408, the order of the requested parcels may be rearranged to minimize the travel of the read head of the device that reads the parcels from the media. For example, for slow media, such as CD-ROM, performance may be improved when scattered or skipped read support is provided. The media device isolation layer 408 may be tailored to a specific type of media and may be specifically prepared for a particular platform.

When I/O has completed for a parcel, the media device layer 408 posts an associated semaphore to communicate I/O completion to the parcel queue manager 404. Each turnstile object contains an associated semaphore which allows a task or process to suspend processing until a requested parcel is loaded. When the parcel queue manager 404 detects I/O completion, it informs the parcel cache manager 59. The parcel cache manager 59 causes the bLoaded flag 306 (in FIG. 9) to be set in the associated parcel header 264 for the parcel that has been read into the cache.

e. Pre-cache Limiting

As mentioned above, some navigation functions 28 implement pre-caching. Although pre-caching can be a valuable way to enhance performance of a navigation system, it can detract from performance if it occurs when the navigation system resources are needed for an immediate data request. Accordingly, it is desired to provide a way to manage pre-cache requests so that they can be prioritized relative to immediate requests. In a present embodiment, the parcel queue manager 404 is used to manage and prioritize pre-cache requests. Since pre-cache requests are based upon predictions of which data may be—but are not actually yet—needed, pre-cache requests may be assigned a lower priority than requests for immediately needed parcels. The parcel queue manager 404 assigns handles to pre-cache requests for this purpose. This facilitates canceling pre-cache requests if the navigation system resources are needed to satisfy an immediate request for data from the navigation functions 28.

Figure 12:
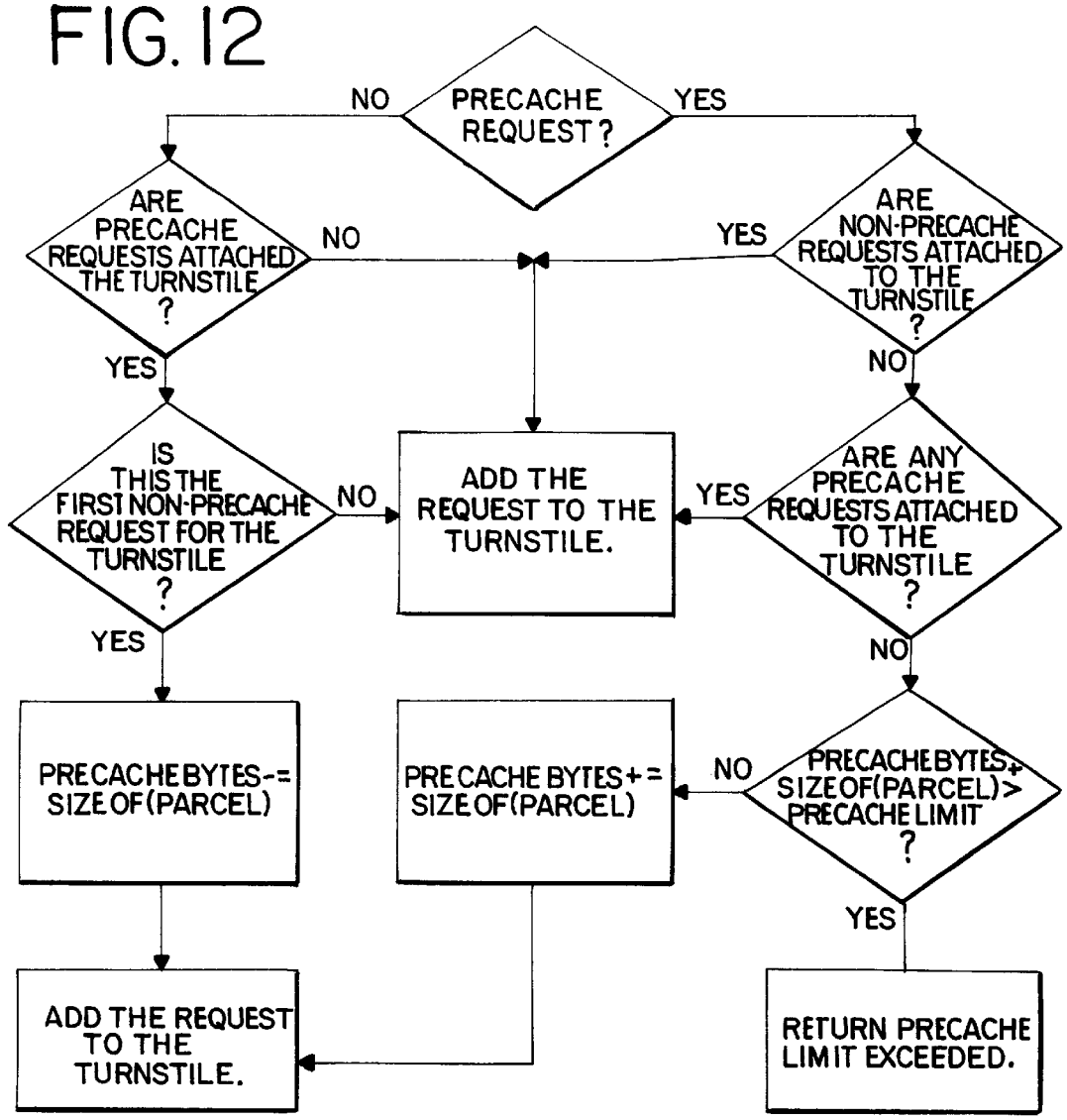
FIG. 12 is a flow chart illustrating the steps implemented by the parcel queue manager of FIG. 11 to limit pre-caching.

One way that a present embodiment of the parcel queue manager 404 manages pre-cache usage is by limiting the extent to which the parcel cache can be used for pre-cache requests. This has the effect of reserving at all times at least a portion of the parcel cache for non-pre-cache requests. FIG. 12 illustrates the programming steps implemented by the parcel queue manager 404 to implement limiting of pre-cache usage. A percentage is defined that establishes an upper limit of the portion of the entire parcel cache that can be used for pre-cache requests. This percentage may be set by the parcel cache manager 404. For example, in one embodiment, pre-cache requests are limited to 70% of the size of the parcel cache. This limit may be configurable.

In implementing this limitation on pre-caching, the parcel queue manager 404 keeps track of the current number of bytes used for pending pre-cache requests. The parcel queue manager 404 uses this number when additional parcel requests are received. If a new pre-cache parcel request, when added to the existing total amount of parcel cache being used for pre-cache requests, causes the upper limit to be exceeded, the pre-cache request is canceled. In keeping track of the pending pre-cache requests, completed requests are not considered nor are requests for parcels that are associated (via the turnstile objects) with both pre-cache and non-pre-cache requests.

Even with pre-cache limiting, it is possible for a query to encounter insufficient memory resources. This may occur due to cache fragmentation or because there are an exceptional number of simultaneous data requests. To address this potential problem, all pre-cache requests may be discarded when insufficient memory resources are encountered. Alternatively, only some select group of pre-cache requests may be canceled.

f. Defragmentation

As mentioned above, each of the parcels of geographic data read from the medium is stored in the parcel cache from which it is then used to provide data to the requesting navigation functions. Requests for data parcels are made in terms of a parcel identifier (e.g., "parcel ID"). A search for the parcel in cache memory 207 is performed using the bash table 266. If the parcel is not in cache, a request to read the parcel from the medium occurs. Once the parcel is in the parcel cache 207, the parcel is locked in the buffer when the buffer address is returned to the navigation application. This prevents the buffer from being swapped out when a request is active. This lock is released when the parcel is released by the navigation application 28.

Most of the time, the parcel cache is full and unable to accommodate new parcels without discarding existing blocks. Sometimes, a rearrangement of the blocks within the cache can coalesce enough space to fit an incoming parcel without discarding any existing blocks. The parcel cache manager 59 tracks the amount of free space within each buffer 220 in order to determine whether defragmentation may be to obtain sufficient space to store a new parcel.

In a present embodiment, the extent to which defragmentation is used is configurable. For example, defragmentation may be configured to be relatively aggressive, relatively non-aggressive, or in between aggressive and non-aggressive. With non-aggressive defragmentation, no defragmentation occurs unless the amount of free memory (which is not necessarily contiguous) is at least twice the size necessary for the new parcel. With aggressive defragmentation, defragmentation is implemented when the amount of free memory (which is not necessarily contiguous) is at least equal to the size necessary for the new parcel.

Figure 13:
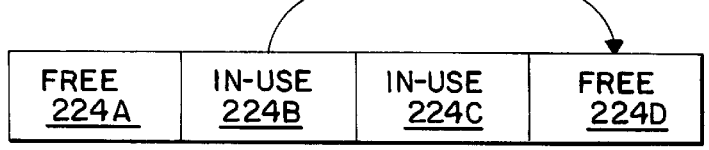
FIG. 13 is a diagram illustrating a defragmentation step performed by the parcel cache manager of FIGS. 2 and 11.
Figure 14:
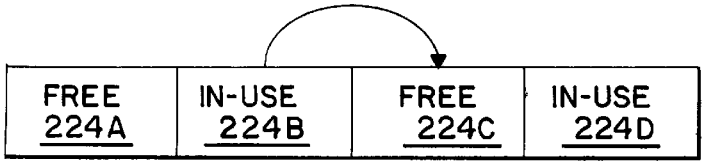
FIG. 14 is a diagram illustrating another defragmentation step.

When the parcel cache manager 59 performs defragmentation, it relocates a block whenever one of two conditions is true: First, as illustrated in FIG. 13, the parcel cache manager 59 performs a defragmentation when an in-use block 224B adjacent to a free block 224A is able to completely fill another free block 224D. Second, as illustrated in FIG. 14, the parcel cache manager 59 performs a defragmentation when a single in-use block 224B is between two free blocks 224A and 224C.

In a present embodiment, the allocated memory grows from the top of the cache (address-wise) down. This is due to the fact that allocating memory from the end of a free block is easier than from the beginning (the free block is resized instead of unlinked, resized, and relinked). Also, the parcel headers 264 are arranged in a list ordered by address, each holding a size value (i.e., "pages 294" in FIG. 9) which can be used to find the next block. The last page within a free block (i.e., which forms a boundary tag for the block) also contains a size value, that allows moving backwards through the list of free blocks for the purpose of coalescing them.

The parcel cache manager 59 performs the defragmenting function by starting at the top of the cache and working backwards to the beginning. Blocks that are locked (i.e., where the "lockCount 302" in FIG. 9>0) or wired (i.e., "bWired 308" in FIG. 9≠0) are not considered for relocation. Also the defragmenting function terminates if sufficient free space has been gained to satisfy the allocation request.

Pseudo code for the defragmenting process is as follows:
FOREACH block(a), scanning from highest to lowest
  IF block(a) is in-use THEN
    IF adjacent blocks are free THEN
      relocate block to the highest free block
  ELSE
    FOREACH in-use block(b), scanning from lowest to
      previous(block(a))
    IF size of block(a) ==size of block(b) AND
      block(b) is adjacent to a free block THEN relocate block(b) to block(a)
ENDIF In an alternative embodiment, successful defragmentation is recorded in a statistics structure within the parcel manager 59. The parcel manager 59 may then use these statistics to control the frequency of defragmentation intelligently.

In an alternative embodiment, the parcel cache 207 may be used without defragmentation. If the parcel cache is large enough, it may be more efficient to discard parcels entirely rather than move them around to defragment the cache.

g. Space Allocation

Typically, after the navigation system has been operated for a while, the only free space within the cache are small fragments created by the freeing/allocation of different sized parcels. To satisfy a request for a parcel that is not in cache, the parcel manager 59 may make multiple passes over the cache chain, returning as soon as the allocation can be fulfilled. In a first pass, the parcel manager 59 checks if a block large enough to satisfy the request is available. If a large enough block is not available, the parcel manager 59 defragments the cache (if defragmentation is enabled and the criteria mentioned above are met).

If defragmentation does not produce sufficient room for the new parcel, the parcel manager 59 discards via a least-recently-used (LRU) algorithm, as explained below. The LRU algorithm attempts to minimize the number of parcel reads and takes age into consideration. The LRU algorithm makes two passes in an attempt to satisfy the requested number of pages. A first pass operates on the oldest 75% of the LRU, discarding and allocating blocks that match these criteria:

1. The block is twice the size of the request or larger, and it is within the oldest 25% of the cache.

2. The block is an exact match of the requested size.

3. The block is adjacent to a free block such that freeing the in-use block will result in a free space of sufficient size.

The first pass seeks to discard a single parcel to satisfy the request. If this fails to provide enough room after processing the oldest 75% of the cache, a second pass is made that discards blocks based strictly upon LRU. Finally, if there is still not enough room, all pre-cache requests are canceled (by the parcel queue manager 404).

V. Advantages of the Disclosed Embodiments

The embodiments disclosed above provide a parcel cache that uses memory resources relatively efficiently. Also, the disclosed embodiments result in relatively little fragmentation. These advantages are achieved in part by separating the parcel header information from the parcel data. This results in parcel sizes that generally fit into the available blocks and avoids relatively large unusable portions of memory.

Another advantage provided by the disclosed embodiments is that by using a hash table to determine which parcels are located in the cache, the cache does not have to be examined directly to determine its contents. This is particularly beneficial in larger systems with relatively large caches since a relatively large cache can take a significant amount of time to examine. Thus, cache sizes from several hundred kilobytes to several gigabytes are supported. This makes the disclosed embodiments versatile so that the same cache system can be used in both relatively small systems, such as hand-held navigation systems and in-vehicle systems with relatively little memory, and relatively larger systems, such as networked servers with lots of memory.

Another advantage provided by the disclosed embodiments is that the parcel cache can be defragmented efficiently. Memory blocks are moved when necessary. Defragmentation is configurable so that it can be tailored to the requirements of the particular hardware platform and type of usage. Defragmentation can be turned off completely for large cache/fast media environments.

Another advantage provided by the disclosed embodiments is that they handle parcels of different sizes relatively well. This allows the geographic data to be stored on the medium in parcel sizes that organize the geographic data most efficiently.

VI. Alternative Embodiments

The disclosed embodiments represent only specific implementations of the inventive concepts and various other kinds of implementations are considered to come within the scope of the present disclosure. For example, other kinds of data structures, instead of hash tables and header pools may be used to implement the functions associated with indexing the parcels in cache and identifying the locations of the parcels in the cache.

The parcels of geographic data may be stored in the parcel cache in either compressed or de-compressed form. For example, if a parcel has been decompressed to satisfy a request from the application, the decompressed parcel may be stored in the parcel cache in its decompressed form, thereby avoiding the need to decompress the parcel again if the data in the parcel is needed a second time. The parcel header may include information that indicates the decompressed size of the parcel so that sufficient space in the parcel cache can be made available to hold the parcel in its decompressed form. Alternatively, the parcels may be stored in the parcel cache in the same compressed format in which they are stored on the medium. Storing the parcels in their compressed form in the parcel cache has the advantage that less memory is required per parcel thereby allowing more parcels to be stored. Both compressed and decompressed parcels may be stored in the cache at the same time For example, if parcels are stored in the parcel cache in response to a pre-cache request, they may be stored in compressed form, and then de-compressed only if they are actually needed. Once a parcel has decompressed to satisfy a request from the application, the parcel may then be stored in its de-compressed form, and the compressed copy of the parcel is discarded.

In the embodiments described above, each header pool is formed from a part of each buffer of memory that is used for parcel cache and contains headers that refer to the parcels in its respective buffer of memory. In alternative embodiments, the header pool may be located in another portion of memory outside the buffer of memory that contains the parcels which are represented by the parcel headers contained in the header pool.

In alternative embodiments, the navigation system should be understood to include any computer-based system that provides navigation functions to an end-user regardless of hardware platform or architecture. For example, the navigation system may include any kind of portable system, such as hand-held systems or systems installed on personal digital assistants or personal computers. In alternative the navigation system may include navigation application software installed on a personal computer, such as a desktop computer. Further, the navigation system may be implemented in various different environments, including networked environments and client-server platform environments. The navigation application program and the geographic database need not be located in the same location, but may connected over a network. The geographic database may be located remotely from the end user and the data transmitted to the end-user over a wireless network.

In the embodiments described above, the cache was described as holding parcels of geographic data. In alternative embodiments, the cache may hold geographic data that is not parcelized or that is organized using a different kind of arrangement. For example, the cache can be used to hold individual data records that are not organized into parcels. These data records may be either compressed or not compressed. If the geographic data in the cache is not organized into parcels (or similar groupings), data structures, similar to the hash table and parcel headers, would be provided that identify the data in the cache and the locations of the data in the cache. In other respects, this embodiment would operate and be used similarly.

In the embodiments described above, certain terminology is used to refer to components, data structures, and so on in the navigation system and application. Other terminology may be used to refer to these kinds of components, data structures, and so on, and it is understood that the subject matter disclosed herein is not intended to be limited to any particular terminology that expresses similar concepts.

Resizing the Parcel Cache

As described above in the first embodiment, the initial buffer for the parcel cache is passed by the application into the parcel cache subsystem upon initialization. Additional buffers for the parcel cache may be passed into the parcel cache subsystem at later times to increase the amount of space in the parcel cache. After being added to the parcel cache, one of these additional buffers may be requested to be returned to the application. This may not be possible (if there is any locked parcel in the buffer), or it may be possible only after relocating parcels from this buffer into other buffers or only after discarding parcels from this buffer. Thus, several options may be provided with the request to return the additional buffer to the application, including (in the present embodiment) an option to suspend the requesting task or process until locked parcels become unlocked (by other tasks or processes). Furthermore, several options may be provided with the passing of the additional buffer into the parcel cache subsystem, including (in the present embodiment) an option to reserve the additional buffer for parcels requested only by the task or process which passed the additional buffer into the parcel cache subsystem (although these parcels are shared with other tasks or processes); this option may increase the likelihood that the buffer can be later returned to the same task or process.

Subsector Parcels

The size of a parcel may be a multiple of a "subsector" unit which subdivides the smallest addressable unit (known as a "sector") of the medium. This may be done to conserve storage space on the medium by reducing wastage due to the parcel data content not exactly filling its storage space. For example, in a present embodiment for a CD-ROM medium (for which the sector unit size is 2 Kb), the size of a parcel is constrained to be a multiple of 256 bytes, so the wasted data in a parcel amounts to less than 256 bytes (instead of amounting to less than 2 K if the size of the parcel were constrained to be a multiple of 2 Kb).

In the case of "subsector" parcels, there are several possible methods by which parcels may be loaded into and stored within the parcel cache. In the present embodiment, all of the sectors comprising a parcel are read in one I/O request operation directly into the cache and are stored completely within the cache; however, portions of the first and last sectors that are not part of the parcel occupy wasted space in the cache. This embodiment uses just one I/O request and requires no copying of data from temporary buffers, but does waste some cache space (on average, about 1 sector per parcel). In this present embodiment, the page size is 1 sector, and the parcel header structure contains an extra field indicating the offset of the parcel within its first sector. In a second embodiment, the parcel would be read in one I/O request into a multiple sector temporary buffer and then only its pages would be copied into the cache. In this later embodiment, the page size would be the subsector unit. There would be no wasted cache space, but space would be required for the temporary buffers and extra processing would be required to copy from the temporary buffer into the cache. In a third embodiment, the parcel would be read in up to three I/O requests, such that the first and last requests would be for a single sector into a temporary buffer, and the middle request would be directly into the parcel cache. The page size in this third embodiment would be the subsector unit. There would be no wasted cache space, and the temporary buffer and copying would be limited to only the first and third I/O requests, but three separate I/O requests would be required.

It is intended that the foregoing detailed description be regarded as illustrative rather than limiting and that it is understood that the following claims including all equivalents are intended to define the scope of the invention.

We claim:

1. A system for managing memory for a navigation system that uses geographic data, the system comprising
   a cache occupying a portion of said memory and used for holding portions of the geographic data; and
   at least one data structure that identifies each of the portions of the geographic data contained in said cache and associates each of the portions so identified with a position in said cache at which the portion is located.

2. The invention of claim 1 wherein said at least one data structure comprises:
   a plurality of first data structures, each of said first data structures identifying a position in said cache at which a respective one of said portions of geographic data is stored; and
   a second data structure that includes an identification of each of said portions of geographic data contained in said cache, wherein each of said identifications is associated with one of said plurality of first data structures.

3. The invention of claim 1 wherein said geographic data are comprised of a plurality of data records and wherein each of said portions of geographic data comprises a portion of said plurality of data records.

4. The invention of claim 1 wherein said geographic data are comprised of a plurality of data records and wherein each of said portions of geographic data comprises a spatially organized portion of said plurality of data records wherein the data records in each portion represent geographic features that are encompassed within a separate one of a plurality of rectangular areas which together encompass the entire geographic region.

5. The invention of claim 1 wherein the portion of said memory occupied by said cache is allocated at initialization of said navigation system.

6. The invention of claim 1 wherein said portion of memory occupied by said cache can be augmented during runtime by addition of at least one buffer.

7. The invention of claim 1 wherein said cache comprises at least one buffer that forms a contiguous address range in said memory.

8. The invention of claim 1 wherein said memory is formed of a plurality of pages, all having the same size.

9. The invention of claim 8 wherein said page size is 2 K.

10. The invention of claim 1 wherein said geographic database is stored on a physical medium.

11. The invention of claim 10 wherein said physical medium is a CD-ROM disc.

12. The invention of claim 1 wherein said navigation system comprises multiple parcel caches.

13. The invention of claim 1 wherein said portions of the geographic data are generally formed in sizes of $2^n$ Kilobytes, wherein n is an integer value greater than 1.

14. The invention of claim 13 wherein said memory is formed of a plurality of pages, all having the same size, and all having a size of $2^m$ Kilobytes, wherein m is an integer value greater than 1.

15. The invention of claim 14 wherein said page size is 2 K.

16. The invention of claim 1 wherein said at least one data structure occupies a portion of said memory other than the portion of said memory occupied by said cache.

17. The invention of claim 1 wherein said cache comprises a plurality of buffers, wherein each of said plurality of buffers comprises a contiguous address range of said memory and is used for holding at least one of said portions of geographic data,
   and wherein said at least one data structure comprises:
   a plurality of pools of first data structures, each of said plurality of pools associated with a separate one of said plurality of buffers, and each of said first data structures in each of said pools identifying one of said portions of geographic data contained in said buffer with which its respective pool is associated; and
   a second data structure that includes an identification of each of said portions of geographic data contained in said cache, wherein each of said identifications is associated with one of said plurality of first data structures.

18. The invention of claim 2 wherein each of said first data structures includes information that identifies a position in said cache at which storage of the respective portion of geographic data starts.

19. The invention of claim 2 wherein each of said first data structures includes information that identifies a size in said cache used for storage of the respective portion of geographic data.

20. The invention of claim 1 wherein each of said portions of geographic data represents a minimum amount of said geographic data that can be accessed at a time by said navigation system in a single read operation.

21. A cache management system for a navigation system that uses a geographic database and that has a memory, said cache management system comprising:

a cache for parcels of geographic data, wherein each of said parcels comprises a portion of a plurality of data records that form said geographic database, and wherein said cache is formed of at least one contiguous buffer of said memory, wherein said at least one buffer is substantially larger than the sizes of said parcels so that a plurality of parcels can occupy said buffer;

a header pool located outside said contiguous buffer of memory and containing header information for each of the parcels that occupy said buffer; and a hash table located outside said contiguous buffer of memory and containing a searchable index of parcel identifiers, each of which refers to said header information in said header pool, whereby a parcel contained in said cache can be located.

22. A method for operating a navigation system including a memory, wherein the navigation system executes a navigation application program to provide navigation functions and uses a geographic database having data records that represent geographic features in a geographic region and wherein said geographic database is organized into a plurality of parcels on a medium, each of said parcels including a plurality of the data records, the method comprising the steps of:

providing a contiguous portion of said memory for use as a parcel cache;

during execution of the navigation application program to provide said navigation functions, storing parcels of data read from said medium into said parcel cache;

storing data relating to each of said parcels stored in said parcel cache in a header structure maintained in a portion of the memory separate from said parcels.

23. The method of claim 22 further comprising:

storing an index identifying each of said parcels, wherein said index refers to the respective header structure maintained separate from said parcels.

24. The method of claim 23 wherein said index is a hash table.

25. A method of operating a navigation system that includes a memory, wherein the navigation system executes a navigation application program to provide navigation functions and uses a geographic database having data records that represent geographic features in a geographic region, wherein said geographic database is organized into a plurality of parcels each of which includes a plurality of the data records, the method comprising the steps of:

requesting parcels that contain data required to provide said navigation functions; and organizing identifications of said requested parcels into a queue of parcel identifications, wherein multiple requests for the same parcel are linked to single parcel identification in said queue.

26. The method of claim 25 further comprising the step of forwarding said queue of parcel-identifiers to a media device layer to read said parcels from the geographic database.

27. The method of claim 25 where a request for a parcel that represents data not yet needed for performing a navigation function is not linked to one of said single parcel identifications in said queue if adding said parcel that represents data not yet needed for performing a navigation function to a parcel cache in said memory which is used to store all parcels read from said geographic database causes a limit imposed on the portion of said parcel cache that can be used for parcels that represent data not yet needed for performing a navigation function to be exceeded.

28. The method of claim 25 further comprising:

storing a hash table in said memory, said hash table indexed on identification data of each of said parcels in said parcel cache.

29. A method for operating a navigation system including a memory, wherein the navigation system executes a navigation application program to provide navigation functions and uses a geographic database having data records that represent geographic features in a geographic region and wherein said geographic database is organized into a plurality of parcels on a medium, each of said parcels including a plurality of the data records, and further wherein a contiguous portion of said memory is used as a parcel cache for storing parcels read from said medium in blocks thereof, and further wherein data relating to each of said parcels in said parcel cache is stored in a header structure maintained in a portion of the memory separate from said contiguous portion used as said parcel cache, the method comprising the step of:

defragmenting said parcel cache in order to store a parcel therein when said parcel cache already contains a plurality of parcels, wherein said defragmenting comprises:

skipping any block contains a parcel indicated by the header structure to be locked; and if an in-use block is completely able to fill an adjacent free block of said contiguous portion of said memory, or if a single in-use block is between two free blocks of said contiguous portion of said memory, moving the block indicated by the header structure to be in-use to the adjacent block indicated in the header structure to be free.

* * * * *